(12) United States Patent
Mani

(10) Patent No.: US 8,180,024 B2
(45) Date of Patent: May 15, 2012

(54) METHOD AND SYSTEM OF CALL COMPLETION BASED ON CALLER SELECTED CALL TREATMENT

(75) Inventor: Babu Mani, Murphy, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1091 days.

(21) Appl. No.: 12/052,467

(22) Filed: Mar. 20, 2008

(65) Prior Publication Data
US 2009/0238353 A1 Sep. 24, 2009

(51) Int. Cl.
*H04M 1/64* (2006.01)
(52) U.S. Cl. ........... 379/70; 379/46; 379/88.16; 379/84; 379/135; 379/201.02; 379/201.01; 379/207.02; 379/257
(58) Field of Classification Search ............... 379/88.02, 379/201.02, 211.02, 212.01, 46, 70, 84, 88.16, 379/135, 201.01, 207.02, 207.05, 207.08, 379/257
See application file for complete search history.

(56) References Cited

U.S. PATENT DOCUMENTS

| 7,724,884 | B1 * | 5/2010 | Bilder et al. | 379/201.02 |
| 2004/0114747 | A1 * | 6/2004 | Trandal et al. | 379/211.02 |
| 2005/0129206 | A1 * | 6/2005 | Martin | 379/211.01 |
| 2005/0141687 | A1 * | 6/2005 | Ozugur et al. | 379/201.02 |
| 2006/0227957 | A1 * | 10/2006 | Dolan et al. | 379/212.01 |

* cited by examiner

*Primary Examiner* — Antim Shah

(57) ABSTRACT

In the present invention, a caller is presented with the state of the call as detected by the network, along with a number of potential options, such as: request sequential or parallel call notification to one or more other stations; end the call but leave a voicemail for the caller even if the called party does not subscribe to voicemail; end the call but leave a text message for the caller if the station is capable of receiving the text message; send a text or voice message as e-mail to the called party, if the called party permits such a service; request the network to leave a missed call notification along with a number to dial back; request to notify the caller when the original called party is idle or willing to accept a call; or any number of other options the service provider is capable of supporting.

20 Claims, 3 Drawing Sheets

METHOD AND SYSTEM OF CALL COMPLETION BASED ON CALLER SELECTED CALL TREATMENT

BACKGROUND

When a party makes a call (referred to as a caller or calling party) to a telephone, cellular phone, terminal or user equipment (collectively referred to as a station) over a telecommunications network, typically the call is immediately answered by the called party (also referred to as the terminating party), which is the desired outcome and desire of the caller. If the call is not answered or encounters a busy condition, the caller is sometimes given the option to request that the network re-try the call whereby several re-attempts are performed by the network for a period of time. This service is known as Automatic Callback (ACB). In the case of ACB, the caller (who, in this context, is the subscriber to the ACB service) is requesting the network to retry his previous call attempt.

In a business environment, the caller also has the option to impose call waiting on the terminating party, if the terminating party happens to be engaged in another call. This service is known as Originating Call Waiting. But, this service is rarely used and not typically offered to residential subscribers.

Conventionally, a called party, when busy or not answering the call, has a number of options to re-direct the call to voicemail or to forward the call to a different number. The called party also has an option to sequentially, or in parallel, signal one or more other stations when the call is not answered by the station which received the original call notification.

There also exists a menu-driven service, where a call is first answered by an Interactive Voice Response (IVR) machine (also known as media server) and the IVR plays one or more prompts and requests input from the caller before terminating the call to a desired destination. This is a terminating service, that is the called party determines the course of action to be applied to the call.

However, there is no current telephony feature or service that gives the caller an option to dynamically select a call treatment when a call is not answered by the original called party. What is desired is a method and system wherein the caller determines how a call, not immediately answered by the called party, is to be handled by the network.

SUMMARY

The present invention is a method and system that allows a caller to determine how a call, not immediately answered by the called party, is to be handled by the network. In the present invention, a caller is presented with the state of the call as detected by the network, along with a number of potential options, such as: request sequential or parallel call notification to one or more other stations; end the call but leave a voicemail for the caller even if the called party does not subscribe to voicemail (that is, a network element records the voice message from the caller, then signals the called party and when the called party answers the call, the network element plays the voice message); end the call but leave a text message for the caller if the station is capable of receiving the text message; send a text or voice message as e-mail to the called party, if the called party permits such a service; request the network to leave a missed call notification along with a number to dial back; request to notify the caller when the original called party is idle or willing to accept a call; or any number of other options the service provider is capable of supporting.

DETAILED DESCRIPTION

The present invention is a method and system that allows a caller to determine how a call, not immediately answered by the called party, is to be handled by the network. In the present invention, a caller is presented with the state of the call as detected by the network, along with a number of potential options, such as: request sequential or parallel call notification to one or more other stations; end the call but leave a voicemail for the caller even if the called party does not subscribe to voicemail (that is, a network element records the voice message from the caller, then signals the called party and when the called party answers the call, the network element plays the voice message); end the call but leave a text message for the caller if the station is capable of receiving the text message; send a text or voice message as e-mail to the called party, if the called party permits such a service; request the network to leave a missed call notification along with a number to dial back; request to notify the caller when the original called party is idle or willing to accept a call; or any number of other options the service provider is capable of supporting.

Figure 1:
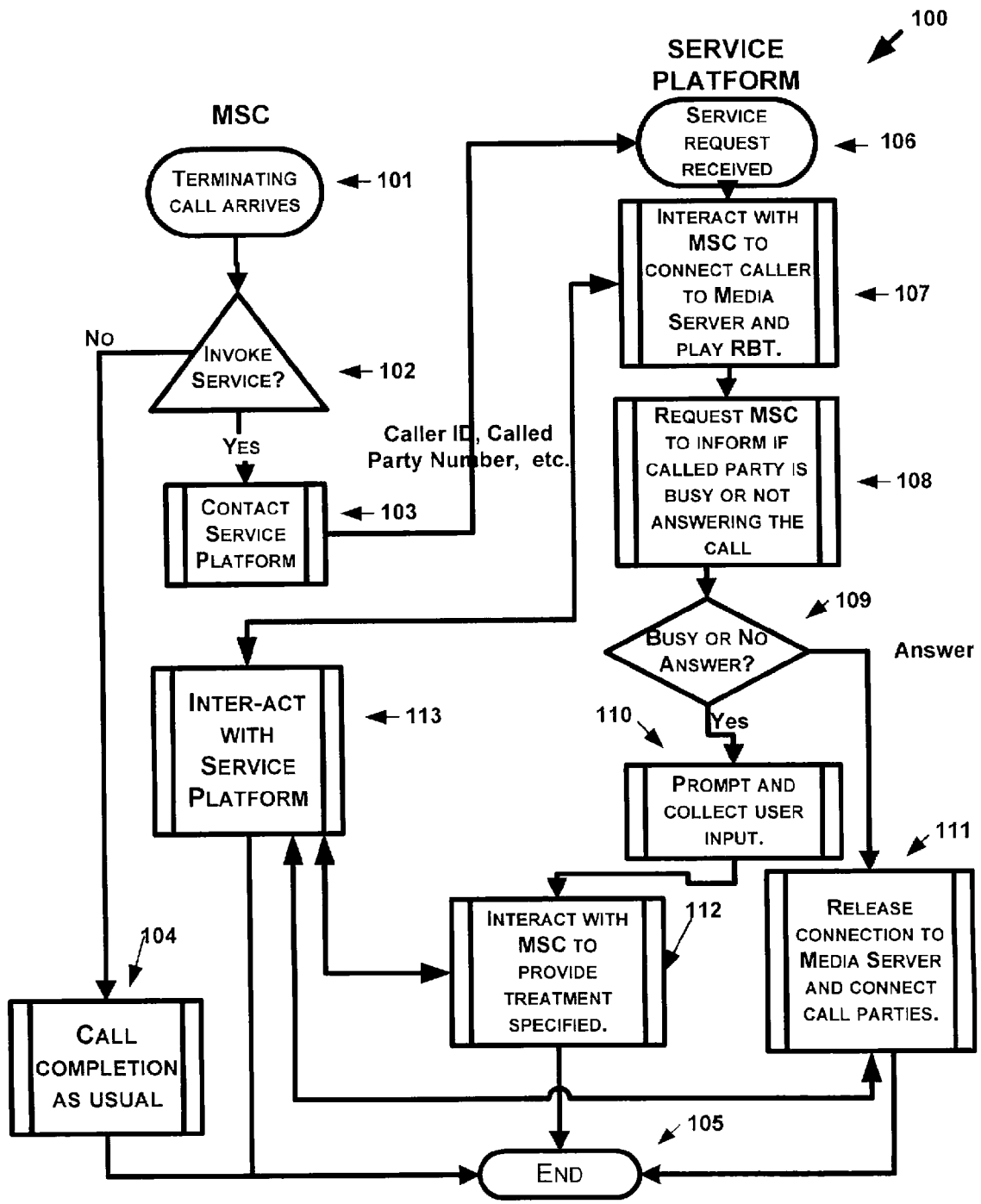
FIG. 1 illustrates a flow chart of the present invention, in combination with an existing Ring Back Tone (RBT) service wherein the called party is the subscriber of the service facilitated by the present invention.

FIG. 1 illustrates a flow chart 100 of the present invention, in combination with an existing Ring Back Tone (RBT) service. In this embodiment, the present invention is a terminating service--that is, the called party subscribes to the service, as is the case with RBT. The flow chart further illustrates that the present invention can be implemented where the called party has not subscribed to RBT service. As seen therein, a caller at-tempts to signal the station of a called party and the call arrives at a terminating exchange at step 101. In step 102, a service platform determines whether a standard call treatment or call treatment based on an option selected by the caller is to be invoked. If not, then in step 104, conventional call processing occurs and the method terminates at step 105.

If call treatment selected by the caller is to be invoked in step 102, then a service platform is contacted in step 103 and the service platform receives the request in step 106. This service platform can also be, and may be referred to as, an application server or, in traditional telephony terms, a service control point working in conjunction with an interactive voice response (IVR) unit or an intelligent peripheral (IP) player, which is a media server. The application server alone or with other servers, hosts computer software that can be adapted to implement the present invention. In steps 107, the service platform interacts with a Service Switching Point (SSP), such as a Mobile Switching Center (MSC) (step 113) or a softswitch or similar telephone exchange, to connect the station of the caller to a media server to play the RBT, if the station of the called party is subscribed to a RBT service. In step 108, the SSP, here, an MSC, is then requested to inform the caller if the station of the called party is busy or not answering the call. The notification of busy or no answer is determined in step 109. If the call is answered by the station of the called party, then the connection to the media server is released and the parties are connected in step 111. The call then ends at step 105. If the call is not answered in step 109 as the station of the called party is busy or not answering in step 109, then the station of the calling party is notified and input from the station of the caller is prompted in step 110. In step 112, the SSP, here an MSC, interacts with the service platform of step 113 to provide the caller selected treatment. Such treatment options includes, but are not limited to, at least one of: request sequential or parallel call notification to one or more other stations; end the call but leave a voicemail for the caller even if the called party does not subscribe to voicemail (that is, a network element records the voice message from the caller, then signals the called party and when the called party answers the call, the network element plays the voice message); end the call but leave a text message for the caller if the station is capable of receiving the text message; send a text or voice message as e-mail to the called party, if the called party permits such a service; request the network to leave a missed call notification along with a number to dial back; request to notify the caller when the original called party is idle or willing to accept a call; or any number of other options the service provider is capable of supporting. The call is then ended in step 105.

Figure 2:
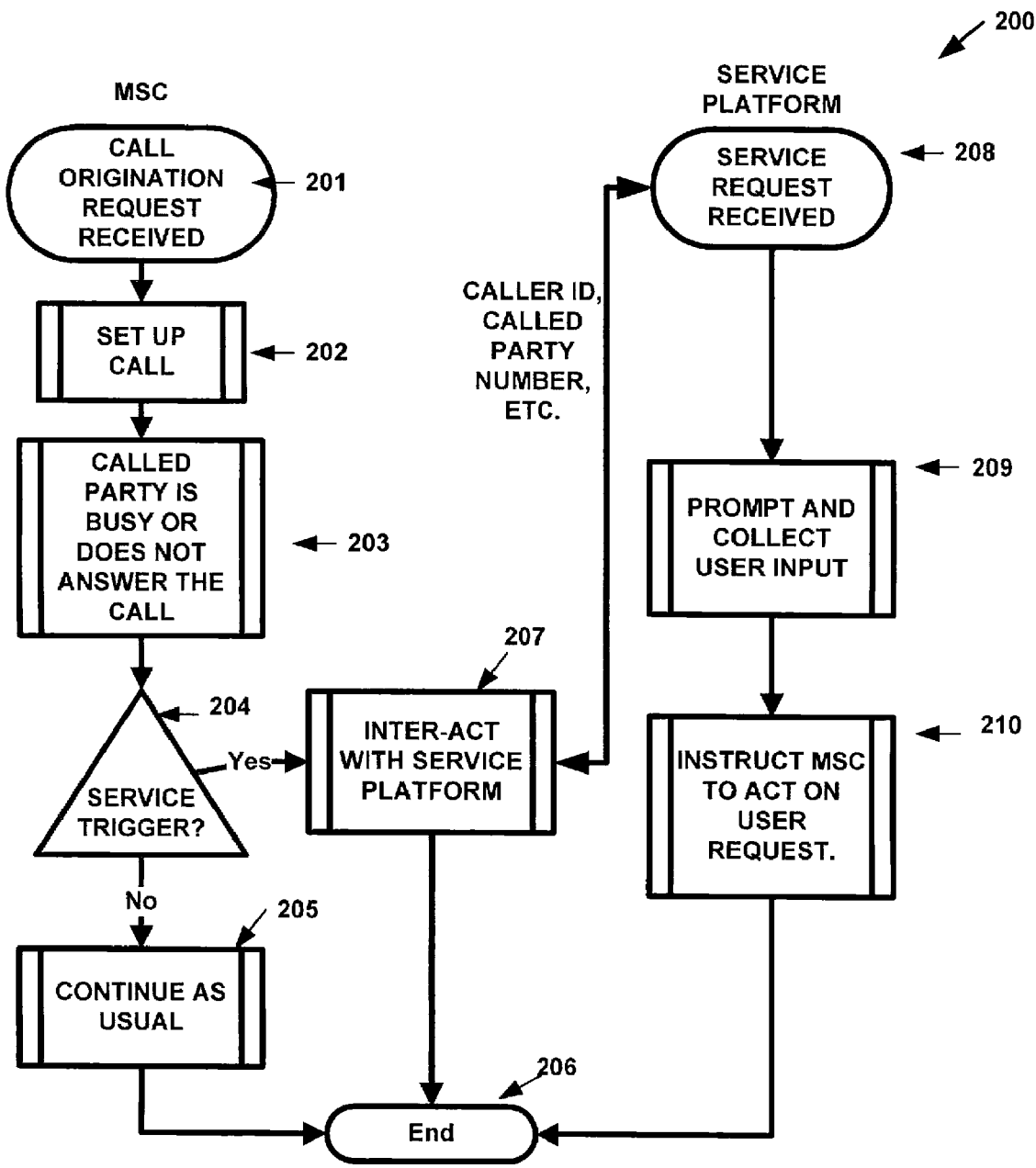
FIG. 2 illustrates a flow chart of an alternative embodiment of the present invention as an originating service, wherein the calling party is the subscriber of the service facilitated by the present invention.

FIG. 2 illustrates a flow chart 200 of an alternative embodiment of the present invention as an originating service, that is where the calling party is the subscriber of the service facilitated by the present invention. As seen therein, a call origination request is received at step 201. In step 202, the call is set up. If it is determined in step 204 that the station of the called party is busy or is not answering the call, a service trigger is invoked in step 204. If the service is not triggered, then in step 205, the call continues in a conventional manner and terminates at step 206. If the service facilitated by the present invention is triggered in step 204, then in steps 207 and 208, the SSP, here an MSC, interacts with the service platform whereby, the service platform receives the request to invoke the caller selected treatment. This service platform can also be, and may be referred to as, an application server or, in traditional telephony terms, a service control point working in conjunction with an interactive voice response (IVR) unit or an intelligent peripheral (IP) player, which is a media server. The application server alone or with other servers, hosts computer software that can be adapted to implement the present invention. The station of the calling party is notified and input from the calling party via their station, is prompted in step 209. In step 210, the SSP, here an MSC, provides the selected treatment. Such treatment options include, but are not limited to, at least one of: request sequential or parallel call notification to one or more other stations; end the call but leave a voicemail for the caller even if the called party does not subscribe to voicemail (that is, a network element records the voice message from the caller, then signals the called party and when the called party answers the call, the network element plays the voice message); end the call but leave a text message for the caller if the station is capable of receiving the text message; send a text or voice message as e-mail to the called party, if the called party permits such a service; request the network to leave a missed call notification along with a number to dial back; request to notify the caller when the original called party is idle or willing to accept a call; or any number of other options the service provider is capable of supporting. The call is then ended in step 206.

Figure 3:
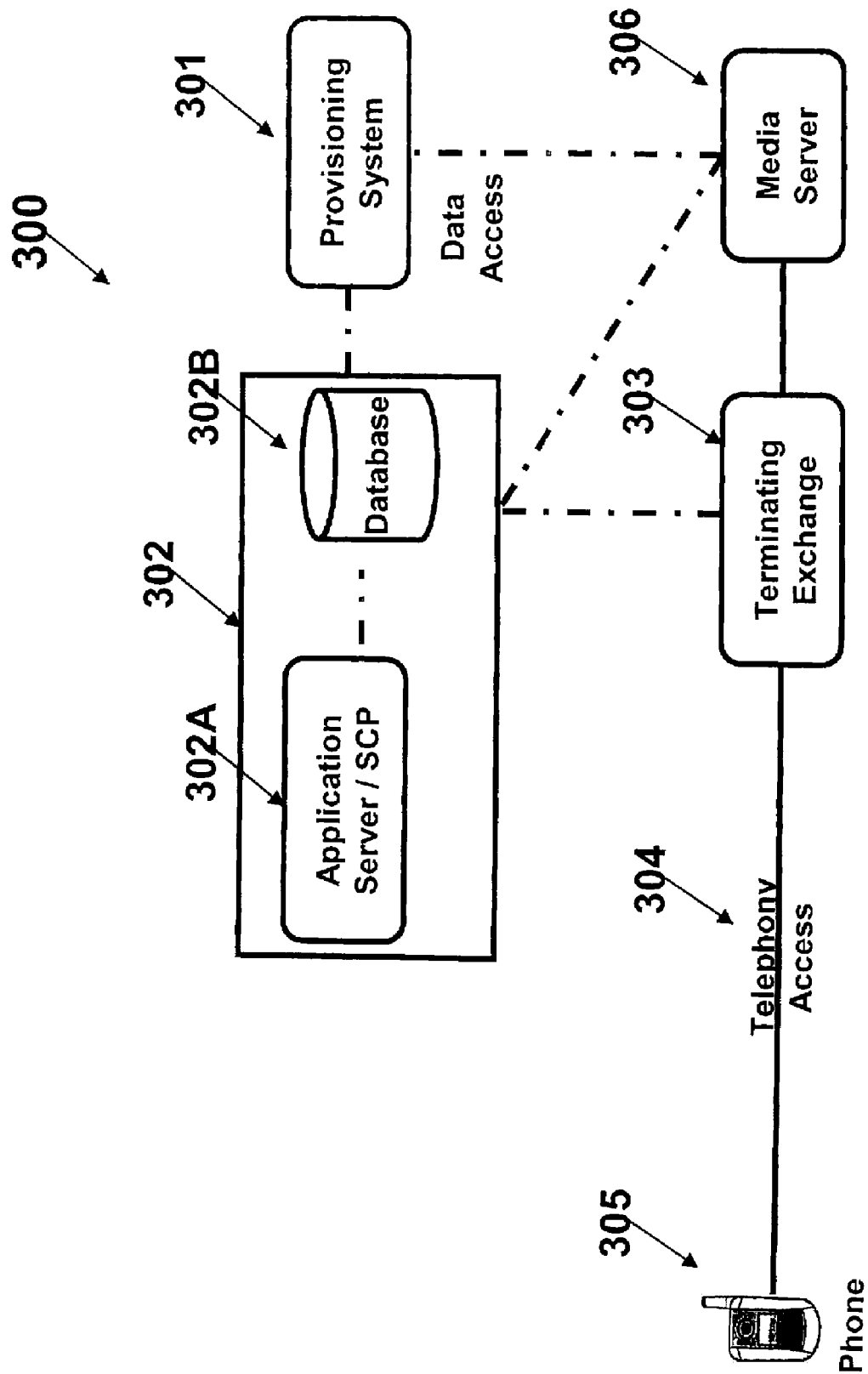
FIG. 3 is a block diagram of the present invention that implements the method seen in FIG. 1.

FIG. 3 is a block diagram 300 of the present invention that implements the method seen in FIG. 1. When the present invention is implemented as an originating service as seen in FIG. 2, the service is from the originating SSP, which interfaces with the SCP. As seen therein, the subscriber subscribes to the service provided by the present invention over a provisioning system 301. The provisioning system 301 is coupled to an application server/application database 302 and a media server 306. If the subscriber has subscribed to the service facilitated by the present invention, treatment options are stored at the application database 302B. Such treatment options include, but are not limited to: request sequential or parallel call notification to one or more other stations; end the call but leave a voicemail for the caller even if the called party does not subscribe to voicemail; end the call but leave a text message for the caller if the station is capable of receiving the text message; send a text or voice message as e-mail to the called party, if the called party permits such a service; request the network to leave a missed call notification along with a number to dial back; request to notify the caller when the original called party is idle or willing to accept a call; or any number of other options the service provider is capable of supporting. The application server 302A is a functional node of a telecommunications system and includes, but is not limited to, a service platform, an application server or service control point. Based on such information or data, calls are provided selected treatment from options stored in, and invoked from database 302B. When a terminating exchange 303 queries the application server 302A, the application server 302A checks the subscriber's preferences from the application database 302B, and notifies or directs the terminating exchange 303 as to what treatment the call should be given. For example, if the called party is not available or busy, then the application server 302A can cause the terminating exchange 303 to present the calling party with options as to how the call is to be treated. Generally, the application server 302A and associated application database 302B maintain the set of rules for the treatment of a call based on the treatment options.

The present invention can be maintained in a node for handling calls in a telecommunications system or distributed over several nodes, the nodes including at least a means for maintaining the options for the treatment of a call. Further, the present invention can be embodied in a computer program adapted to be loaded into at least one memory and executed by at least one processor, the program including the caller preferences program and the options for the treatment of a call.

While particular embodiments of the present invention have been described, it is not intended that the present invention be limited thereto, as it is intended that the invention be as broad in scope as the art will allow and that the specification be read likewise. While the apparatus of the invention is shown in block diagram format, it will be appreciated that the block diagram may be representative of and implemented by hardware, software, firmware, or any combination thereof. Moreover, the functionality of certain aspects of the block diagram can be obtained by equivalent or suitable structure. It will therefore be appreciated by those skilled in the art that yet other modifications could be made to the provided invention without deviating from its spirit and scope as claimed.

What is claimed:

1. A method of handling a call in a telecommunications system, comprising the steps of:

allowing a subscriber to subscribe to an originating service wherein when the subscriber subsequently initiates a call as a calling party towards a called party and if the called party does not answer the call then the calling party is presented with a state of the call and a number of call treatment options, wherein the originating service comprises the following steps:

storing call treatment options in a database;

receiving a call signal from the calling party for the called party at a mobile switching center;

determining, at the mobile switching center, whether call treatment based on calling party selection is to be invoked;

if not, then performing at the mobile switching center conventional call processing;

if call treatment based on calling party preference is to be invoked, then contacting a service platform which performs the following steps;

if the station of the called party is busy or is not connecting the call, then informing the calling party that a station of the called party is busy or not connecting the call;

prompting the calling party to provide an input for treatment based on the call treatment options stored in the database; and providing the selected treatment, where one of the stored call treatment options is to end the call but leave a voicemail for the called party even if the called party does not subscribe to voicemail, wherein leaving the voicemail comprises: recording the voicemail from the calling party by a network element then the network element signaling the called party when the called party becomes available and when the called party answers the call, playing the voicemail by the network element to the called party.

2. The method of claim 1, wherein the service platform is a an application server or, in traditional telephony terms, a service control point working in conjunction with an interactive voice response (IVR) unit or an intelligent peripheral (IP) player, which is a media server.

3. The method of claim 1, further comprising the step of, if Ring Back Tone (RBT) service has been subscribed to, interacting between the service platform and a Service Switching Point (SSP) to connect a call to a media server to play a RBT after the step of contacting a service platform.

4. The method of claim 3, wherein the SSP is one from the group consisting of a Mobile Switching Center (MSC), softswitch and a telephone exchange.

5. The method of claim 1, wherein the stored called treatment options further include one or more of: request sequential or parallel call notification to one or more other stations; end the call but leave a text message for the called party if the station is capable of receiving the text message; send a text or voice message as e-mail to the called party, if the called party permits such a service; request the network to leave a missed call notification along with a number to dial back; and request to notify the calling party when the original called party is idle or willing to accept a call.

6. The method of claim 1, wherein the service platform is selected from the group consisting of: a RBT service platform, an application server and a service control point.

7. The method of claim 1, wherein the invocation of the call treatment by a caller is dictated by a rule that no calls be signaled to the called party.

8. The method of claim 1, wherein the called party is notified that the caller has selected a call treatment option for the busy or unanswered call.

9. The method of claim 8, wherein the notification is at least one selected from the group consisting of an e-mail, voicemail, text message or multimedia message.

10. The method of claim 1, wherein the originating service is provisioned through an Internet portal.

11. The method of claim 1, wherein the service is provisioned by contacting the subscriber's service provider who then sets up the service.

12. A method of handling a call in a telecommunications system, comprising the steps of:

allowing a subscriber to subscribe to an originating service wherein when the subscriber subsequently initiates a call as a calling party towards a called party and if the called party does not answer the call then the calling party is presented with a state of the call and a number of call treatment options, wherein the originating service comprises the following steps:

receiving, at a mobile switching center, a call origination request;

setting up, at the mobile switching center, the call;

if the call is answered, connecting, at the mobile switching center, the call between the calling party and the called party;

invoking, at the mobile switching center, a service trigger if a station of the called party is busy or is not connecting the call;

interacting between a service platform and the mobile switching center whereby, the service platform receives the request to inform the calling party that the station of the called party is busy or is not connecting the call, wherein the service platform performs the following steps;

connecting a station of the calling party to a media server;

prompting from the calling party a call treatment for the call from a plurality of call treatment options; and instructing the mobile switching center to act upon the call treatment selected by the calling party, where one of the call treatment options is to end the call but leave a voicemail for the called party even if the called party does not subscribe to voicemail, wherein leaving the voicemail comprises: recording the voicemail from the calling party by a network element then the network element signaling the called party when the called party becomes available and when the called party answers the call, playing the voicemail by the network element to the called party.

13. The method of claim 12, wherein the service platform is one selected from the group consisting of: an application server or, in traditional telephony terms, a service control point working in conjunction with an interactive voice response (IVR) unit and an intelligent peripheral (IP) player, which is a media server.

14. The method of claim 12, wherein the called treatment options include one or more of: request sequential or parallel call notification to one or more other stations; end the call but leave a text message for the called party if the station is capable of receiving the text message; send a text or voice message as e-mail to the called party, if the called party permits such a service; request the network to leave a missed call notification along with a number to dial back; and request to notify the calling party when the original called party is idle or willing to accept a call.

15. A system for handling calls in a telecommunications system, comprising:

a provisioning system node configured to allow a subscriber to subscribe to an originating service wherein when the subscriber subsequently initiates a call as a calling party towards a called party and if the called party does not answer the call then the calling party is presented with a state of the call and a number of call treatment options;

a service platform having one of an application server or service control point and a database;

a mobile switching center interacting with the service platform;

the database storing the call treatment options selectable by the calling party;

the mobile switching center configured to receive a call origination request;

the mobile switching center configured to set up the call;

if the call is answered, the mobile switching center is configured to connect the call between the calling party and the called party;

the mobile switching center is configured to invoke a service trigger if a station of the called party is busy or is not connecting the call;

the mobile switching center interacts with the service platform:

the service platform is configured to receive the request to inform the calling party that the station of the called party is busy or is not connecting the call, wherein the service platform performs the following steps;

the service platform is configured to connect a station of the calling party to a media server;

the service platform is configured to prompt from the calling party a call treatment for the call from a plurality of call treatment options; and the service platform is configured to instruct the mobile switching center to act upon the call treatment selected by the calling party, where one of the call treatment options is to end the call but leave a voicemail for the called party even if the called party does not subscribe to voicemail, wherein leaving the voicemail comprises: recording the voicemail from the calling party by a network element then the network element signaling the called party when the called party becomes available and when the called party answers the call, playing the voicemail by the network element to the called party.

16. The system of claim 15, wherein the call treatment options include at least one of: request sequential or parallel call notification to one or more other stations; end the call but leave a text message for the called party if the station is capable of receiving the text message; send a text or voice message as e-mail to the called party, if the called party permits such a service; request the network to leave a missed call notification along with a number to dial back; request to notify the calling party when the original called party is idle or willing to accept a call; and any number of other options the service provider is capable of supporting.

17. The system of claim 15, further including a media server for playing Ring Back Tone (RBT).

18. The system of claim 15, wherein the application server or service control point and the database comprises a functional node of a telecommunications system.

19. The system of claim 18, wherein the node is a service platform, an application server or service control point.

20. The system of claim 15, further comprising a computer program adapted to be executed by a processor that maintains the call treatment options.

* * * * *

UNITED STATES PATENT AND TRADEMARK OFFICE
CERTIFICATE OF CORRECTION

| | | |
|---|---|---|
| PATENT NO. | : 8,180,024 B2 | Page 1 of 1 |
| APPLICATION NO. | : 12/052467 | |
| DATED | : May 15, 2012 | |
| INVENTOR(S) | : Mani | |

It is certified that error appears in the above-identified patent and that said Letters Patent is hereby corrected as shown below:

IN THE SPECIFICATIONS:

In Column 2, Line 48, delete "at-tempts" and insert -- attempts --, therefor.

In Column 3, Line 36, delete "204" and insert -- 203 --, therefor.

IN THE CLAIMS:

In Column 5, Lines 33-34, in Claim 2, delete "is a an" and insert -- is an --, therefor.

Signed and Sealed this
Eleventh Day of September, 2012

David J. Kappos
*Director of the United States Patent and Trademark Office*